United States Patent
Osborn et al.

(10) Patent No.: US 6,425,087 B1
(45) Date of Patent: Jul. 23, 2002

(54) METHOD AND APPARATUS FOR USING RESIDUAL ENERGY IN A BATTERY-POWERED COMPUTER

(75) Inventors: Neal A. Osborn, Milpitas; Francis James Canova, Jr., Fremont; Nicholas M. Twyman, San Francisco; Scott R. Johnson; Steven C. Lemke, both of Sunnyvale, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/321,686

(22) Filed: May 28, 1999

(51) Int. Cl.$^7$ ................................................ G06F 1/28

(52) U.S. Cl. ......................... 713/340; 714/22; 714/24

(58) Field of Search .......................... 713/340, 300; 714/14, 15, 22, 24

(56) References Cited

U.S. PATENT DOCUMENTS

| | | | |
|---|---|---|---|
| 3,744,034 A | | 7/1973 | Paul ........................ 340/172.5 |
| 4,860,372 A | | 8/1989 | Kuzunuki et al. ............. 382/13 |
| 4,972,496 A | | 11/1990 | Sklarew ........................ 382/13 |
| 5,231,381 A | | 7/1993 | Duwaer ....................... 340/712 |
| 5,305,394 A | | 4/1994 | Tanaka ........................ 382/13 |
| 5,349,668 A | * | 9/1994 | Gladstein et al. ........... 713/340 |
| 5,389,745 A | | 2/1995 | Sakamoto .................... 178/18 |
| 5,434,929 A | | 7/1995 | Beernink et al. ........... 382/187 |
| 5,442,794 A | * | 8/1995 | Wisor et al. ................. 713/340 |
| 5,444,192 A | | 8/1995 | Shetye et al. .................. 178/18 |
| 5,452,371 A | | 9/1995 | Bozinovic et al. .......... 382/187 |
| 5,528,743 A | | 6/1996 | Tou et al. |
| 5,534,892 A | | 7/1996 | Tagawa ...................... 345/173 |
| 5,581,772 A | * | 12/1996 | Nanno et al. ............... 713/340 |
| 5,615,284 A | | 3/1997 | Rhyne et al. ............... 382/187 |
| 5,621,817 A | | 4/1997 | Bozinovic et al. .......... 382/189 |

(List continued on next page.)

FOREIGN PATENT DOCUMENTS

EP 0 560 510 A1 9/1993 ............. G06F/1/28

OTHER PUBLICATIONS

"Method for Warning Users of a Low Battery Condition on a Battery–Powered Computer", *IBM Technical Disclosure Bulletin*, vol. 29, No. 6, Nov. 1986, pp. 2461–2463.

(List continued on next page.)

*Primary Examiner*—Glenn A. Auve
(74) *Attorney, Agent, or Firm*—Van Mahamedi; Hickman Palermo Truong & Becker LLP

(57) ABSTRACT

Methods and apparatus are described for providing a time-based warning indicating that the energy capacity of a primary energy source of a battery-powered computer has discharged to a low level, and using residual energy of the primary energy source to perform at least one pre-cutoff function. The time-based warning ensures that the warning is provided in a timely manner by overcoming problems caused by analog to digital converter voltage measurement accuracy limitations and flat battery operating voltage versus discharge curves. The primary energy source can be a rechargeable battery, which can also be the sole energy source for the computer. The battery provides power to operate the computer until the battery voltage discharges to the cutoff voltage. The methods and apparatus provide advantages because they reserve the residual energy in the battery to perform at least one pre-cutoff function within a first duration before the battery discharges to the cutoff voltage. For example, the residual energy can be used to retain data stored in the computer between opportunities to charge the battery. Some embodiments of the invention include hardware resources coupled with the processor to lock out power and application activation when the rechargeable battery has discharged to a predetermined hardware lockout voltage. The value of the hardware lockout voltage can be based on the battery retaining a residual energy sufficient for performing the corresponding pre-cutoff function within an amount of time that is expected to enable the user to perform the function.

37 Claims, 3 Drawing Sheets

U.S. PATENT DOCUMENTS

| | | | |
|---|---|---|---|
| 5,630,148 A | | 5/1997 | Norris |
| 5,698,822 A | | 12/1997 | Haneda et al. ............... 178/18 |
| 5,710,931 A | * | 1/1998 | Nakamura et al. .......... 713/340 |
| 5,717,936 A | * | 2/1998 | Uskali ....................... 713/340 |
| 5,784,295 A | * | 7/1998 | Hinohara ..................... 702/63 |
| 5,841,901 A | | 11/1998 | Arai et al. .................. 382/187 |

OTHER PUBLICATIONS

Katsumi, O., "Battery Exchange Informing Device for Electronic Equipment", *Patent Abstracts of Japan* (JP 04279918), vol. 17, No. 76, Feb. 16, 1993.

Minoru, M., "Electronic Appliance", *Patent Abstract of Japan*, (JP 61246821), vol. 11, No. 93, Mar. 24, 1987.

Yuichi, I., "Power Control Circuit For Battery Operation Device", *Patent Abstracts of Japan* (JP 06059785), vol. 18, No. 298, Jun 7, 1994.

Yukichi, N., "Electronic Equipment", *Patent Abstracts of Japan* (JP 04307613), vol. 17, No. 127, Mar. 17, 1993.

Yoshihiro, Y., "Copying Machine", *Patent Abstracts of Japan* (JP 05297659), vol. 18, No. 96, Feb. 16, 1994.

Katsuyoshi, K., "Battery Life Monitoring Device", *Patent Abstracts of Japan* (JP 08220199), vol. 1996, No. 12, Dec. 26, 1996.

Gray, R. et al., "Efficient MC68HC08 programming: reducing cycle count and improving code denisty", *Dr. Dobb's Journal*, vol. 20, No. 5, May 1995, pp. 70–75.

Ruley, J. et al., "Handheld–to–Handheld Combat", *Windows Magazine*, No. 811, p. 55, Nov. 1997.

Dayton, D., "FRx extends reporting power of Platinum Series", *PC Week*, vol. 8, No. 5, p. 29(2), Feb. 1991.

Forbes, J. et al., "Palm PCs get a Big Hand (What's Hot)", *Windows Magazine*, No. 905, p. 96, May 1998.

Penwarden, M., "More Muscle for HP's OmniBook", *Windows Magazine*, No. 501, p. 110, Jan. 1994.

Feigel, C., "IBM, Motorola preview embedded PowerPCs; 403 and 505 processors combine strong performance with low cost", *Microprocessor Report*, vol. 8, No. 6, pp. 1–5, May 1994.

Bursky, D., "Evolving DSP chips do more", *Electronic Design*, vol. 38, No. 23, pp. 51–59, Dec. 1990.

* cited by examiner

METHOD AND APPARATUS FOR USING RESIDUAL ENERGY IN A BATTERY-POWERED COMPUTER

CROSS REFERENCE TO RELATED APPLICATION

This application relates to and incorporates herein by reference as if fully set forth herein the following United States patent applications: Ser. No. 09/299,063, entitled "Detection of an Accessory Device Connected to a Portable Computer," filed, Apr. 23, 1999, having inventors Eric M. Lunsford, Steven C. Lemke, Neal A. Osborn, and Francis J. Canova, Jr.

BACKGROUND OF THE INVENTION

1. Field of the Invention

The invention relates generally to the field of battery-powered computers. More particularly, the invention relates to using residual energy in battery-powered computers to perform a function before the battery discharges to its cutoff voltage.

2. Discussion of the Related Art

Many conventional battery-powered computers provide only a single warning message before the primary battery discharges to the cutoff voltage and the battery-powered computer can no longer be powered by the primary battery, or a lockout of applications occurs. The user expects to be able to perform one or more pre-cutoff functions to ensure that data stored in the battery-powered computer is not lost when the battery discharges to the cutoff voltage. Similarly, the user expects to be able to execute certain applications after the warning before the applications are locked out.

The single warning message is typically triggered by the operating voltage of the primary battery discharging below a certain predetermined warning voltage. Such operating voltage based warning messages can fail to meet user expectations when, due to accuracy limitations of the voltage detection component(s) used to monitor the operating voltage, the message is provided too late for the user to perform the desired pre-cutoff function, or execute the pre-lockout application. Therefore, what is needed is a warning message that meets user expectations by ensuring that the user can perform the pre-cutoff functions before the battery discharges to the cutoff voltage and can execute certain applications before the applications are locked out.

Another problem with the prior art is that conventional battery-powered computers rely on an alternative energy source to ensure retention of data when the energy level of the primary energy source goes below a minimum energy level for continued normal functioning of the computer. These alternative energy sources can include small batteries such as watch batteries, large capacitors, and other energy storage devices. The capacity requirements for the alternative energy sources are typically much lower than the primary energy source capacity.

For some conventional battery-powered computers, the alternative energy source provides a voltage source when the batteries are replaced. For example, for Palm III™ computers, a capacitor is charged by the primary energy source (two AAA alkaline batteries). The capacitor provides an alternative energy capacity that enables the Palm III to retain data for approximately one minute to three minutes with no charge from the alkaline batteries, e.g., when low charge alkaline batteries are replaced by the user.

A problem with this technology has been that the alternative energy source does not provide enough time for replacement of the primary energy source when the user cannot provide replacement batteries within the proscribed time (e.g., one to three minutes), and data stored in the battery powered computer is therefore lost. Therefore, what is required is a solution that uses the primary energy source to provide sufficient time for data retention during a period of time when the primary energy source is susceptible to discharging to the cutoff voltage or is otherwise unable, in the absence of the solution, to ensure that the data will be retained.

One unsatisfactory approach, in an attempt to solve the above-discussed problems, involves the use of secondary or alternate watch batteries in certain handheld connected organizers that use the Windows® CE operating system. Unless the remaining capacity of the alternate battery is monitored, the alternate battery is subject to unpredictable failure just at the time it is needed most. But, monitoring the remaining capacity of the alternate battery is duplicative of any provision to monitor the capacity of the primary battery and is therefore inefficient.

Methods and apparatus for determining residual battery voltage are provided by U.S. Pat. No. 5,784,295, issued to Hinohara on Jul. 21, 1998. However, these methods and apparatus do not ensure that sufficient time for data retention is provided.

Several laptop computers provide a warning that the main battery needs to be recharged and then place the computer into a sleep mode. The remaining charge of the main battery is then used as a capacitor to retain the data in the memory. The warnings provided by these computers can be too late for the user to complete desired tasks before cutoff because the warnings are based on the operating voltage of the primary energy source, which is subject to inaccurate voltage measurement.

Heretofore, the requirement of using the capacity of the primary battery to ensure that data stored in the computer is retained has not been fully met. What is needed is a solution that addresses this requirement.

SUMMARY OF THE INVENTION

A primary goal of the invention is to reserve a residual battery capacity in a primary energy source of a battery-powered computer for one or more pre-cutoff functions. One example of a pre-cutoff function is using the residual battery capacity to retain data stored in the computer between charging opportunities.

Another goal is to provide a warning message that is based on a measurement of time from when a signal is received by the processor disposed in the computer. The time-based warning avoids voltage measurement accuracy limitations that are characteristic of analog to digital converters and can detrimentally affect the timing of warning messages based on operating voltage measurements.

In accordance with these goals, there is a particular need for a method including a hardware lockout of power and application interrupt signals when the battery capacity has decreased to within a predetermined amount above the cutoff voltage, and a method for providing a time-based warning. The methods and apparatus according to the invention provide advantages because they provide time-based warnings and hardware lockouts that enable the battery-powered computer to use the residual energy in the rechargeable battery to perform pre-cutoff functions such as ensuring that data stored in the computer is retained in between opportunities to charge the battery.

A first and a second aspect of the invention are implemented in various embodiments based on a battery-powered computer including a primary energy source. The primary energy source for operation of the battery-powered computer includes at least one battery and can be a rechargeable battery. In some embodiments the rechargeable battery can be the sole energy source for operation of the battery-powered computer. In other embodiments, a secondary source of energy can be provided to ensure that the data is retained in the memory even after the residual energy in the primary energy source has been depleted to approximately the cutoff voltage.

The first aspect of the invention includes a battery-powered computer having a processor and a memory. The memory is coupled with the processor to: calculate a measure of time after a signal is received by the processor, and to provide a time-based warning message based on the measure of time. The warning message indicates that the energy capacity of the battery has discharged to a low level.

The second aspect of the invention includes a battery-powered computer having a battery, a processor and hardware resources coupled to the processor. The battery has an operating voltage, and a cutoff voltage below which no functioning of the battery-powered computer can be executed using the primary energy source. The hardware resources are coupled with the processor to respond to the operating voltage being approximately equal to a hardware lockout voltage by preventing the activation of power and applications in the battery-powered computer. Upon discharging to the hardware lockout voltage, the primary energy source retains a residual energy above the cutoff voltage sufficient for the battery-powered computer to perform at least one function before the primary energy source discharges to the cutoff voltage.

A third aspect of the invention is a method implemented in a battery-powered computer for providing a warning based on at least one measurement of time. The method includes a processor receiving a signal at approximately a first time and starting at least one timer at approximately the first time. The method also includes tracking at least one measure of time from approximately the first time, and the battery-powered computer responding to a first measure of time being approximately equal to a second time by providing a warning that a primary energy source of the battery-powered computer has discharged to a low voltage.

A fourth aspect of the invention is a method for using residual energy in a battery-powered computer. The method includes the primary energy source discharging to approximately a hardware lockout voltage level; and responsive thereto, a processor preventing activation of power and applications in the battery-powered computer. Upon discharging to the hardware lockout voltage, the primary energy source has a residual energy sufficient to perform at least one function within a first duration before the primary energy source discharges to a cutoff voltage.

BRIEF DESCRIPTION OF THE DRAWINGS

These, and other, goals and aspects of the invention will be better appreciated and understood when considered in conjunction with the following description and the accompanying drawings. Various embodiments of the invention are illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

Figure 1:
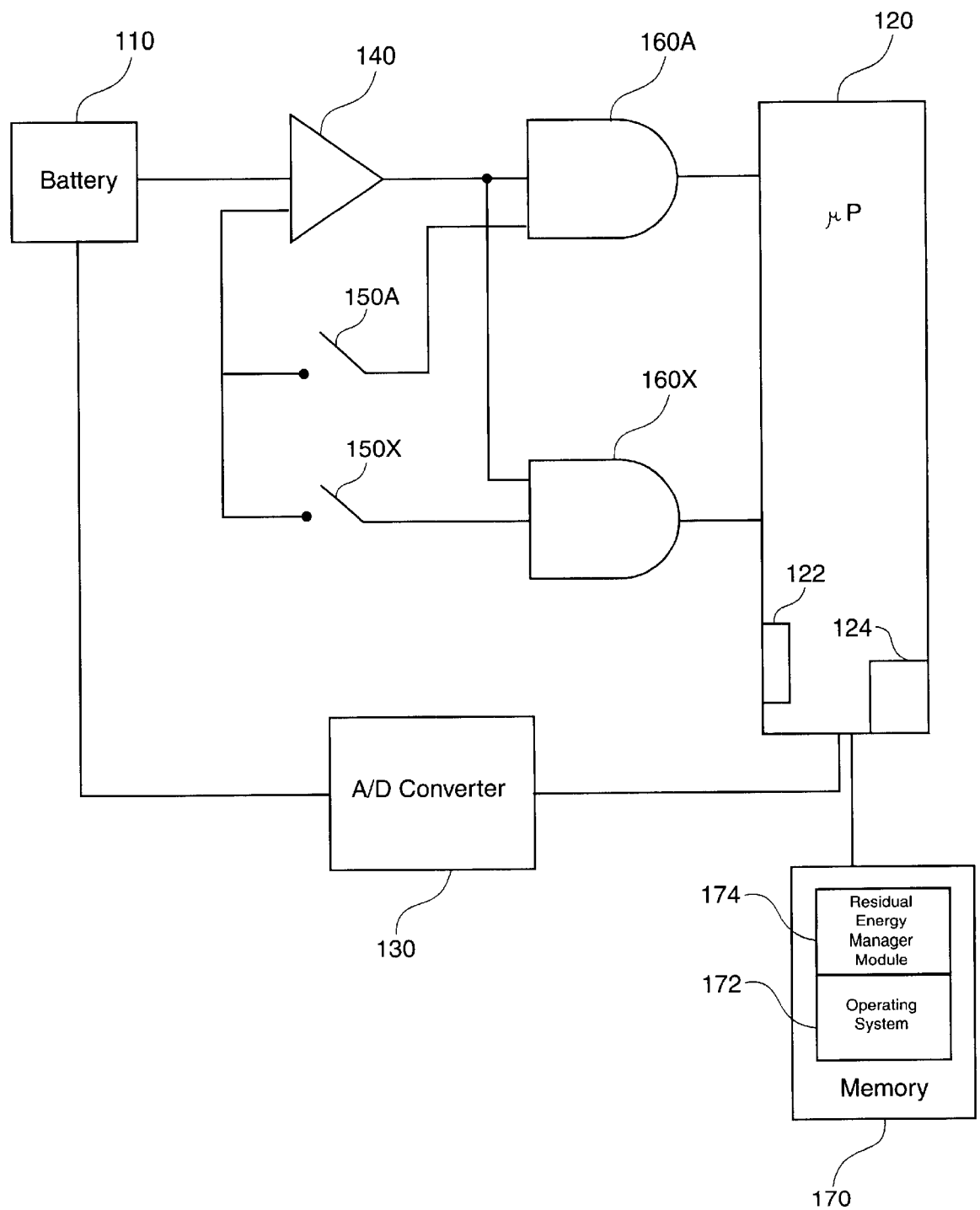
FIG. 1 illustrates a portable computer adapted to user residual battery energy, representing an embodiment of the invention.

The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail. The term coupled, as used herein, is defined as connected, although not necessarily directly, and not necessarily mechanically. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

Methods and apparatus are described for providing a time-based warning message based on a measure of time after a signal is received by the processor. The warning message indicates that the operating voltage has discharged to a low voltage.

Methods and apparatus are described for using residual energy in a primary energy source of a battery-powered computer. The primary energy source can be one or more rechargeable batteries, or one or more batteries that are replaced after discharging. The primary energy source can be the sole energy source for the computer.

The primary energy source can provide power to operate the computer until the primary energy source voltage discharges to a cutoff voltage. In previous systems, when the primary energy source discharges to the cutoff voltage, the computer crashes or otherwise shuts off. After the cutoff voltage is reached, the computer cannot function using the primary energy source to power the computer, unless the primary energy source is replaced, recharged, or otherwise brought back to a voltage level above the cutoff voltage.

The methods and apparatus provide advantages because they reserve an amount of residual energy in the primary energy source to perform at least one pre-cutoff function within a first duration before the primary energy source discharges to the cutoff voltage. The residual energy can be used to retain data stored in the computer between opportunities to charge a rechargeable battery, or to perform a wireless data synchronization. Advantages are also provided because warnings of low operating voltage based on at least one measure of time are produced by the battery-powered computer. These time-based warnings are much less likely to fail than voltage based warnings because of voltage measurement accuracy limitations, or flat discharge-voltage battery characteristics.

Some embodiments of the invention provide a computer including a processor and hardware resources coupled with the processor to lock out power and application activation when the rechargeable battery has discharged to a predetermined hardware lockout voltage. The value of the hardware lockout is based on the primary energy source retaining a residual energy sufficient for performing the corresponding pre-cutoff function within an amount of time that is expected to enable the user to perform the function.

Various methods of using residual energy according to the invention include detecting that the primary energy source has discharged to a voltage level approximately equal to the hardware lockout voltage. The methods also include the processor responding to detecting the voltage level by placing the computer into a low-energy consumption state, and preventing activation of power and applications in the computer.

Battery-Powered Computer Using Residual Energy in Primary Energy Source

Various embodiments of a battery-powered computer 100 according to the invention are represented by FIG. 1. These embodiments include at least one battery 110, a processor 120, an analog to digital converter 130, a voltage comparator 140, activation switches 150A–150X for energy consuming functions, logic gates 160A–160X, and a memory 170.

The battery 110 has an energy capacity that decreases from energy discharge during use of the battery-powered computer 100. The battery 110 also has a cutoff voltage below which battery-powered computer 100 operation does not occur using the battery as the energy source.

The processor 120 can include an interrupt controller 122 and a warning level calculation circuit 124. The memory 170 can include an operating system 172 and a residual energy manager module 174 (otherwise referred to herein as "program").

Some embodiments of the battery-powered computer 100 include only the battery 110, the processor 120, the memory 170, and hardware resources coupled to the processor to provide a hardware lockout that prevents activation of power and applications on the battery-powered computer. Other embodiments include various combinations of the other features described herein to provide responses to decreased battery 110 capacity, such as warning messages and a software lockout.

According to some embodiments of the invention, the battery-powered computer 100 can be powered by a single rechargeable battery 110, as shown in FIG. 1. In other embodiments, the battery 110 acts as the primary energy source, and the battery-powered computer 100 also includes alternative energy sources. The battery 110 can provide the power to operate the battery-powered computer 100 as long as the battery 110 operating voltage is above a cutoff voltage.

According to the first aspect of the invention, the battery-powered computer includes a warning level calculation means. The warning calculation means can be a warning level calculation circuit 124 disposed in the processor 120, or can be a series of software instructions, typically disposed in the memory 170 and executed by standard processor 120 resources.

The memory 170 is coupled with the processor 120 to provide a warning based on a measure of time after a signal is received by the processor 120. The warning message, referred to in the examples below as the second warning, indicates that the energy capacity of the battery 110 is low.

The battery-powered computer 100 can include at least one timer coupled with the warning calculation circuit 124. The timer(s) can be disposed in the warning calculation circuit 124.

The signal starts the at least one timer and can correspond to a first warning based on voltage measurement that the battery 110 operating voltage is low. The measure of time used to determine when the second warning is provided can include elapsed time, or operational time of the battery-powered computer, or whichever of these two times occurs first.

According to the second aspect of the invention, the battery-powered computer 100 can implement methods for using the residual energy of the rechargeable battery 110 to perform at least one pre-cutoff function within a first duration before the battery discharges to the cutoff voltage. Some of these methods are described in the Methods for Using Residual Energy in a Battery-Powered Computer section below.

The battery-powered computer 100 monitors the capacity remaining in the battery 110 as the battery discharges. The battery-powered computer 110 then locks out power and application interrupt signals when the capacity decreases to a residual capacity corresponding to a predetermined voltage. The lockout reserves the residual capacity for performing one or more pre-cutoff functions before the battery 110 discharges to the cutoff voltage. For example the residual energy can be used to ensure that data is retained in the memory 170 between battery charging opportunities.

Some embodiments of the battery-powered computer 100 can implement a hardware lockout of the battery-powered computer 100 when the battery 110 voltage level decreases to a predetermined hardware lockout voltage level. The predetermined hardware lockout voltage can be calculated to ensure that sufficient residual energy remains in the battery 110 to retain data stored in the memory 170 for a period of time between battery charging opportunities, or provide another pre-cutoff function.

The hardware lockout can place the battery-powered computer 100 into a low-energy consumption "sleep" state while also masking interrupt signals including those that initiate certain high-energy functions. The high-energy functions can include data synchronization through a modem, an RS-232 communication port, or using an infrared (IR) port. Other high-energy functions can include using a back-lit display and performing radio frequency wireless communications.

In some embodiments, all applications in the battery-powered computer 100, other than those required to maintain the data stored in the memory 170, are masked by the hardware lockout. The hardware lockout can be viewed as forcing the battery-powered computer 100 to behave as if the rechargeable battery 110 has no remaining usable charge, i.e., discharged below the cutoff voltage; and then using the remaining, or residual, charge to maintain the computer in the sleep state until a predetermined function is performed.

For some embodiments, the hardware lockout reserves sufficient residual energy so that the predetermined function can be performed within a particular target duration after the lockout before the battery 110 discharges to an energy level below that required to perform the function. This target duration can be based on any related user requirement. For example, some embodiments of the Palm V™ portable computer available from 3Com can use the hardware lockout to retain data stored in the memory 170 for two to three days after imposing the hardware lockout. The lockout is implemented in hardware to ensure that the lockout, and associated data retention, is not subject to failure from software errors. The determination of the hardware lockout voltage level can be based on trade-off considerations such as maximizing user access to power and application functions, and providing sufficient time for the user to start recharging the battery 110.

In other embodiments, the required residual energy corresponds to the energy required to perform data synchronization. For some of these embodiments, the residual energy is sufficient to maintain the battery-powered computer 100 in its sleep state for a target duration before the data synchronization function is performed. For example, the target duration could be based on the time expected for a user to gain access to either a base station for an RF wireless data synchronization, a communications cradle for a wired data synchronization, or a device with IR communication capability according to applicable IrCOMM protocols.

In some embodiments, the analog-to-digital (A/D) converter 130 is coupled with the rechargeable battery 110 and the processor 120 to monitor the battery voltage. The A/D converter 130 provides a digital signal corresponding to the operating voltage of the rechargeable battery 110 to the memory 170.

More than one predetermined action voltage level can be detected using a residual energy manager module 174 disposed in the memory 170. The residual energy manager module 174 can store values corresponding to at least one action voltage level. The action voltage levels can correspond to actions such as: a software lockout of power and applications in the battery-powered computer 100, or providing a warning to the user that the batteries 110 have discharged to a low operating voltage.

The residual energy manager module 174 can compare the digital signal provided by the A/D converter with the at least one action voltage level to detect when the battery 110 has discharged to approximately an action voltage level. Upon detecting that the battery 110 operating voltage has discharged to approximately one of the action voltage levels, the residual energy manager module 174 can provide a signal to the processor 120 to cause the action corresponding to the detected action level to occur.

Some embodiments include an interrupt controller 122 disposed in the processor 120. The interrupt controller 122 can be coupled with the A/D converter 130 and the memory 170 to provide a software lockout preventing activation of power and application on the battery-powered computer 100 when the battery 110 has discharged to approximately a software lockout voltage.

Some embodiments of the invention combine the first and second aspects of the invention. These embodiments, provide a time-based warning that occurs before the software (or hardware) lockout, because the time-based warning is not subject to fail because of voltage accuracy limitations of the A/D converter 130.

Methods for Using Residual Energy in a Battery-Powered Computer

Figure 2:
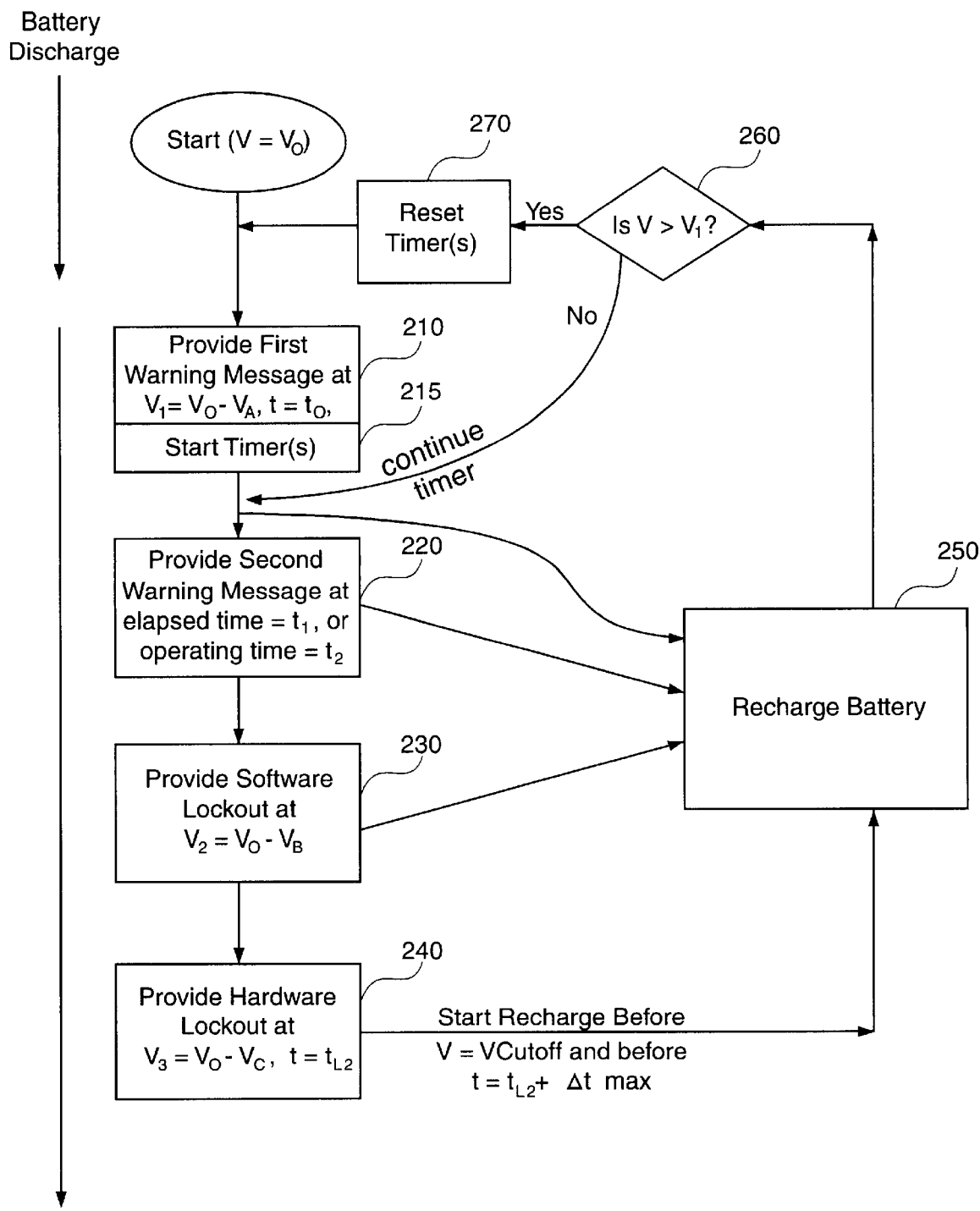
FIG. 2 provides a flow chart illustrating a method of using residual energy in a battery-powered computer to retain data, representing an embodiment of the invention.

A method for using residual energy 200 in a battery-powered computer 100 representing one embodiment of the invention is shown in FIG. 2. The method for using residual energy 200 shown in FIG. 2 includes providing a first warning message (block 210), starting at least one timer (block 215), and providing a second warning message (block 220). Each timer starts at approximately the time when the first warning message is provided to provide a measure of time. The second warning message is provided when the appropriate measure of time approximately equals a predetermined time. Because no voltage measurement is used to calculate when the second warning message is given, the second warning message is not subject to failure based on the accuracy limitations of the voltage measurement component, e.g., the A/D converter 130. The time-based warning also overcomes voltage versus capacity limitations, i.e., flat voltage versus capacity discharge curves, present within some battery technologies.

As shown in FIG. 2, the method for using residual energy 200 continues by providing a software lockout (block 230) of power and application interrupt signals, and providing a hardware lockout (block 240) of power and application interrupt signals as the primary energy source discharges. The value(s) of the timer(s) can provide the basis for providing the second warning message (block 220).

The method for using residual energy 200 can also include recharging the battery (block 250) and repeating one or more of the warning message steps (blocks 210 and 220), and the lockout steps (blocks 230 and 240). In some embodiments, the method for using residual energy 200 includes, after starting the timer(s) (block 215), determining whether the battery 110 has been recharged to a voltage greater than the first warning message voltage (block 260). This determination can be made by including a first warning message voltage recharge level and appropriate code in the residual energy manager module 174.

If the battery 110 has been recharged to a voltage level greater than the first warning message voltage, the method for using residual energy 200 can continue by resetting the timer(s) (at block 270) used to determine when the second warning message is provided (e.g., at block 220). Otherwise, the timers can continue as if no recharging has occurred.

Some embodiments of the method for using residual energy 200 according to the third aspect of the invention include only providing the first message warning 210, starting the timer(s) 215, and providing the second warning 220. More generally, starting the timers 215 can be initiated by any signal received by the processor 120.

Some embodiments of the method for using residual energy 200 according to the fourth aspect of the invention include only the hardware lockout step (block 240) and battery recharging (block 250). In other embodiments, various combinations of one or more of the warning steps (blocks 210 and 220), and the lockout steps (230 and 240) are included. In some embodiments, different pre-cutoff functions are performed after the hardware cutoff (instead of battery recharging) such as wireless data synchronization, copying data to a non-volatile storage device or to a non-volatile integrated circuit (IC) memory. The data can be copied in its entirety, or in some embodiment only a portion of the data can be copied. The non-volatile storage device can be a rotating magnetic media, or a CD-ROM. The non-volatile IC memory can be a flash EEPROM device or a ferro-magnetic device.

Other pre-cutoff functions include switching to another energy source, and performing memory/data integrity testing. The energy source switching could be to non-rechargeable "emergency backup" batteries and can include placing limitations on use of high-energy consumption functions in the battery-powered computer 100. The integrity testing can include applying an error correcting code across the data to help recover data that would otherwise be subject to lose due to the impending low power.

Examples

Specific embodiments of the invention are further described by the following, non-limiting examples which serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

First Example

Figure 3:
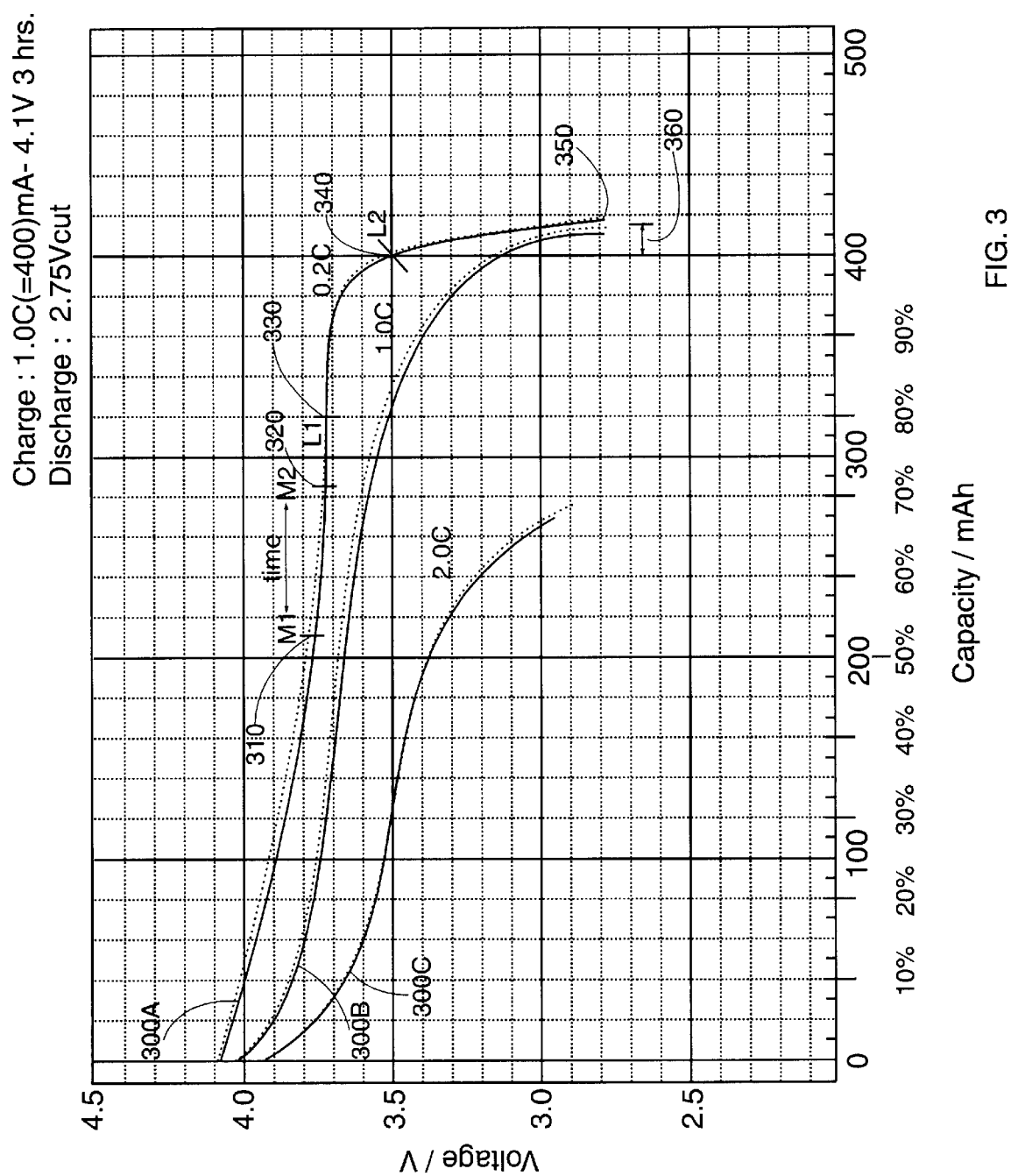
FIG. 3 illustrates a battery discharge curve, representing an embodiment of the invention.

One example of a battery-powered computer 100 according to some embodiments of the invention uses a lithium-ion battery having discharge properties described by the discharge cycles in FIG. 3. The Sanyo UF612248 lithium-ion battery 110 represented by FIG. 3 has a rated capacity (1.0 C) of approximately 400 milliamp-hours for an initial charge of 4.1 volts.

FIG. 3 shows a first discharge cycle curve 300A for a lightly-loaded battery 110 where the discharge rate is approximately 80 milliamperes (mA). Energy efficient portable computers, such as the PalmV from Palm Computing, Inc., have battery 110 discharge rates similar to 80 mA (0.2 C, or one-fifth of the 1.0 C rated capacity) as represented in the first discharge cycle curve 300A. A second discharge cycle curve 300B is shown in FIG. 3 for comparison purposes only, and represents the curve for a moderately-loaded lithium-ion battery 110, e.g., 400 mA discharge rate. The third discharge cycle curve 300C represents a heavily-loaded lithium-ion battery 110, e.g., 800 mA discharge rate.

The voltages for the various message and lockout levels for this first example are based on an estimate for the current used by the battery-powered computer in standby mode of 300 microamps, and an estimate of active use current of 12 milliamps. These message and lockout level values, indicated on FIG. 3, are also based on an average active use time per day of approximately twenty minutes. Based on these estimates, the battery-powered computer 100 consumes approximately 12 milliamp-hours per day during normal operation In some embodiments, the battery-powered computer 100 provides a first warning (otherwise referred to herein as M1, for first warning message) when the battery 110 discharges to a first warning (M1) voltage 310. For some embodiments of the Palm V™ portable computer using the lithium-ion battery 110, the M1 voltage 310 ($V_1$) is set at approximately 3.76 volts and occurs at a time to. The Palm V™ portable computer can be used for approximately 21 days at 25° C. before the M1 warning occurs. The twenty-one day period is based on the battery discharge curve for the lithium-ion battery 110, and a normal usage pattern of twenty minutes per day. The twenty-one day period is based on the assumption that the battery 110 is fully charged to approximately 4.1 volts ($V_0$) at the beginning of the 21-day period. The difference between the fully charged battery 110 voltage $V_0$ and the M1 voltage 310 ($V_1$) is approximately 0.35 volts, and is referred to $V_A$.

In some embodiments, the A/D converter 130 provides a digital value representing the battery 110 voltage to the residual energy manager module 174. The digital value from the A/D converter 130 can be used to overcome voltage resolution limitations characteristic of the voltage comparator 140.

The residual energy manager module 174 can store the M1 voltage 310. In response to receiving a digital value representing a voltage approximately equal to the M1 voltage 310 from the A/D converter 130 during discharge of the battery 110, the residual energy manager module 174 can cause the display of a first warning message on the image screen of the battery-powered computer 100. For certain Palm V™ portable computer embodiments, the first warning includes a warning that "your batteries are low". The first warning can also inform the user that placing the Palm V™ portable computer into the HotSync™ communications cradle will recharge the battery 110.

For some embodiments, the battery-powered computer 100 provides a second warning (M2) 320 message that occurs at an M2 time 320 corresponding to a predetermined measure of time after the first warning (M1) message occurs.

For some Palm V™ portable computer embodiments, the M2 message is triggered by an M2 time 320 corresponding to either three elapsed days after M1 occurs ($t_1$), or sixty minutes of operating time assuming normal usage after M1 occurs ($t_2$), whichever occurs first. M2 is based on time and usage factors instead of a voltage value because of the difficulty in resolving 0.05 volts, and to guarantee that the M2 warning will appear before the software lockout L1. For some embodiments of the Palm V™ portable computer, the M2 message includes "your batteries are extremely low".

A first timer for the second warning can be disposed in the warning level calculation circuit 124 and controlled by the residual energy manager module 174 to track the elapsed time after the M1 warning. A second timer, also disposed in the warning level calculation circuit 124 and controlled by the residual energy manager module 174, can track the battery-powered computer 100 operation time after the M1 warning. The second timer can be adapted to ensure that a light or heavy user will see the second M2 warning at an appropriate M2 time 320 after the first (M1) warning, but before the battery-powered computer 100 locks out.

For example, if the battery-powered computer 100 is used for high-energy consumption functions after the M1 warning, the operating time required before the second (M2) warning is displayed is reduced by an appropriate amount. The reduction in operating time before the M2 warning occurs can be accomplished by accelerating the second timer during operation of high-energy consumption functions. In some embodiments, the high-energy functions can include use of a back-light to enhance the display, RS-232 data synchronization, infrared data synchronization, and wireless communication.

The residual energy manager module 174 can cause the first and second timers to be reset to zero in response to the processor 120 detecting that the battery 110 is being charged after the user sees the M1 message, but before M2. For the Palm V™ portable computer, the battery 110 can be recharged by inserting the Palm V™ portable computer into the HotSync™ communication cradle.

Various embodiments of the invention, including the Palm V™ portable computer, can detect whether the battery-powered computer 100 is connected to the communication cradle as described by U.S. patent application Ser. No. 09/299,063, entitled "Detection of an Accessory Device Connected to a Portable Computer," filed, Apr. 23, 1999 which is incorporated herein by reference. The residual energy manager module 174 can respond to the detection of the connection to the communication cradle by implementing a timer reset function that monitors the battery 110 operating voltage to determine whether the voltage has been charged above a timer reset voltage level as described in the next two paragraphs.

In some embodiments, the processor 120 can respond to an A/D converter 130 digital value indicating that the battery 100 voltage has been charged higher than the M1 voltage by a threshold amount by canceling the timers. For example, given an M1 voltage 310 of 3.76 volts, a timer reset voltage of 3.81 volts can be used by the residual energy manager module 174 to cancel the timers.

The M2 voltage can be approximately in the range of 3.73 to 3.74 volts. Recharge of the battery 10 from the M2 voltage to the initial operating voltage of 4.1 volts in some embodiments of the Palm V™ portable computer using a lithium-ion battery can take approximately thirty minutes.

The margin of 0.05 volts (or 50 millivolts) is used to ensure that the timer-reset voltage is readily distinguished from the M1 voltage 310. This margin is preferred even for properly calibrated A/D converters 130 to avoid resetting the timers when the operating voltage has not actually recharged to the M1 voltage 310.

In some embodiments of the battery-powered computer 100, the accuracy of the digital signal provided by the A/D converter 130 can be improved from approximately 100 millivolts to approximately 50 millivolts by calibrating the A/D converter 130. The temperature and the A/D converter 130 accuracy can force the voltage readings provided to the processor 120 and the residual energy manager module 174 up or down the time scale.

Even with calibration, certain factors contributing to variability (or uncertainty) in the values provided by the A/D converter 130 can be accounted for to ensure that the messages (blocks 210 and 220) and the lockouts (blocks 230 and 240) meet user expectations. For example, drift can provide an uncertainty of approximately 3 millivolts in some embodiments, A/D converter 130 leakage −15 millivolts of uncertainty, long term stability −2.5 millivolts, and FET temperature drift −5 millivolts. These contributions total to an uncertainty of approximately +/−25.5 millivolts if the A/D converter 130 is calibrated using an In-Circuit Tester (ICT).

Further, even an accurate battery 110 voltage measurement is not necessarily an accurate indicator of remaining battery capacity because many battery technologies, especially rechargeable batteries, have a "flat" discharge curve wherein the battery delivers a large portion of the battery's energy at approximately the same voltage. As mentioned above, M2 is based on time and usage factors instead of a voltage value because of the difficulty in resolving 0.05 volts by the A/D converter 130.

The residual energy manager module 174 can store the timer reset voltage level (e.g., 3.81 volts), and code to provide a signal to the processor 120 to reset the first and second timers upon receiving a value from the A/D converter 130 corresponding approximately to the reset voltage level.

In some embodiments, the processor 120 includes an interrupt controller 122. The interrupt controller 122 can be programmed to mask off signals from signal producing components such as power-up buttons, wireless communication antennas, application buttons, connected accessory devices (such as synchronization docking ports and modems), and other components that would otherwise begin energy-consuming processing in the battery-powered computer 100.

In some embodiments of the Palm V™ portable computer, a software lockout (L1) occurs at an L1 voltage ($V_2$) 330 of approximately 3.71 volts. The difference between the fully charged battery 110 voltage and the L1 voltage ($V_2$) 330 is approximately 0.39 volts, and is referred to as $V_B$ in FIG. 2.

According to battery 110 discharge data at 25° C. and 20% of the discharge rate at which the battery capacity is specified, discharge to a battery voltage of approximately 3.71 volts, e.g., the software lockout voltage, occurs approximately 5 days after the second warning (M2) message for an average user. Discharge to the L1 voltage 330 also occurs approximately 7 to 10 days before the battery 110 discharges to the cutoff voltage (2.75 volts) 350 and the user loses data for the average Palm V™ portable computer user.

In some embodiments, the residual energy manager module 174 reconfigures the interrupt controller 122 when the battery 110 discharges to the L1 voltage 330. The reconfiguring prevents the processor 120 from responding to interrupt signals from the power button, application buttons, or connected accessory devices.

The M1, L1, and L2 voltage levels (310, 330 and 340) can be based on providing approximately three days between M1 and M2, and two days between M2 and software lockout L1. The estimated duration between software lockout L1 and cutoff, e.g., loss of battery life when memory 170 contents are lost, is approximately seven days. Approximately five of those days are after the software lockout L1 and before a hardware lockout L2, and approximately two days are provided from the hardware lockout L2 to the battery cutoff voltage 350. The hardware lockout L2 can force the processor 120 to get an interrupt, and lock all the power and application switches.

In order to have seven days after L1 before cutoff, the residual energy is approximately 50 mAh (7.2 mAh/day discharge for standby mode multiplied by seven days). Battery 110 voltage measurements for the Palm V™ portable computer using a lithium-ion battery with the discharge characteristics shown in FIG. 3 revealed the target of seven days between the software lockout L1 and when the battery discharges to the cutoff voltage 350 at 2.5 volts can be provided, on average, by setting the L1 voltage at 3.71 volts.

For some 400 mAh lithium-ion batteries, 350 mAh remain available for general operation before the battery 110 discharges to the 50 mAh residual energy level. This translates to approximately twenty-nine days of normal operation at 12 mAh/day. Therefore, based on the first discharge cycle curve 300A, there is approximately twenty-one days from full charge to M1, approximately three days from M1 to M2, and approximately five days from M2 to L1.

For the Palm V™ portable computer using a lithium-ion battery 110 having the discharge characteristics shown in FIG. 3, the hardware lockout (L2) occurs at a voltage of approximately 3.5 volts and at a time referred to as $t_{L2}$. The L2 voltage 340 is estimated to provide a period in which the data stored in the memory 170 can be retained before the battery 110 discharges to the cutoff voltage 350 of approximately two days. When the battery 110 discharges to the cutoff voltage 350, the battery-powered computer 100 shuts off, and the user loses volatile data stored in the memory 170. The maximum time between L2 and cutoff is referred to as $\Delta t_{max}$. Therefore, in order to effectively implement the method of using residual energy 200 described by this first example, the battery 110 should be recharged before the time $t_{L2}+\Delta t_{max}$.

The L2 to cutoff voltage difference is approximately 0.75 volts for some embodiments of the Palm V™ portable computer, represented by the first discharge cycle curve 300A. Note that L1 and L2 can move relative to each other depending on temperature and component tolerances. Also note that approximately five to ten percent of the battery 110 capacity is saved by L1 and L2 for the pre-cutoff function.

The hardware lockout (L2) can be implemented using hardware resources such as the voltage comparator 140, the activation switches 150A through 150X, and logic gates 160A through 160X. The logic gates 160A through 160X can be connected to the activation switches 150A through 150X, the voltage comparator 140, and the processor 120 as shown in FIG. 1. The logic gates 160A through 160X can be AND gates as shown in FIG. 1. In response to the voltage comparator 140 providing a voltage level approximately equal to the L2 voltage 340, the processor 120 receives a lockout interrupt signal and responds to the lockout interrupt signal by locking out all power, application and connected device interrupt signals.

Using hardware to lockout the application, power and connected device interrupt signals ensures that the lockout will occur, and the residual battery 110 capacity reserved, even if there is a software failure. Such software failures can occur for L1, M1 and M2 and other software driven events because of program crashes or otherwise defective programs.

Also, for some embodiments, the software lockout L1 can fail if the battery is too close to the end of its life and reaches the cutoff voltage 350 too quickly. For example, when the software lockout L1 begins, the processor 120 can remain on for approximately 100 milliseconds because of the time required to read the A/D converter 130 output. The liquid crystal image screen does not power up during the 100 milliseconds period after L1. However, if the user holds down the power button during the 100 milliseconds directly after L1, the processor 120 can cycle on and off to read the AID converter 130 causing the battery 110 to further discharge without the user being aware of the discharge.

Other Examples

Many other examples of battery-powered computers 100 and methods of using residual energy 200 are possible. The memory 170 can include an identification table to address different characteristics for different battery-powered computers 100. These characteristics can include: battery 110 parameters, e.g., charging factors for different battery types, energy usage rates by the particular battery-powered computer 100, e.g., higher energy usage rates for color screens. The characteristics can also include time and voltage factors for triggering the warnings and lockouts based on user preferences, owner usage patterns, or other criteria. Different user profiles can be accommodated by setting different values for M1, M2, and L1, in the residual energy manager module 174. The identification table can be disposed in the residual energy manager module 174, or another portion of the memory 170 in the battery-powered computer 100.

For other embodiments of the invention, different primary energy sources can power the battery-powered computer 100. Rechargeable batteries 110 having discharge curves that differ from those shown in FIG. 3 can be used. In some embodiments, replaceable batteries 110 can be used. For such replaceable batteries 110, the pre-cutoff function can be a data synchronization to ensure that critical data stored in the memory 170 is updated in an external memory source for subsequent retrieval by the battery-powered computer 100 after replacing the batteries.

Modifications to the hardware resources are required to implement changes the L2 voltage. Changes in the L2 voltage can be made by changing the voltage values for the voltage comparator 140. For example, such a change is useful to accommodate a pre-cutoff function that requires substantially greater than the retention of memory used to determine the hardware lockout L2 voltage 340 in the first example above. For such a user, the L2 voltage can be set at a higher voltage value to ensure that the battery-powered computer 100 retains sufficient capacity to perform the function before cutoff.

Some users who do not have ready access to recharging may require additional time between the hardware lockout L2 time ($t_{L2}$) and the latest time for recharge ($t_{L2}+\Delta t_{max}$). Providing this additional time between L2 and cutoff also requires changes to the hardware resources.

Different responses to decreased battery 110 capacity can also be provided by changing the residual energy manager module 174. For example, an automatic synchronization can be implemented when the battery 110 has discharged below a certain value and the battery-powered computer 100 detects a connection to an external memory source.

Different and additional pre-cutoff functions can be accommodated by changing the L1 and L2 voltages.

As discussed above in the Methods for Using Residual Energy in a Battery-Powered Computer, the method for using residual energy 200 can include, after starting the timer(s) (block 215), determining whether the battery 110 has been recharged to a voltage approximately equal to the first warning message M1 voltage (block 260). Other embodiments of the invention use a timer to make this determination instead of determining when the operating voltage has actually been recharged to above the first warning message M1 voltage 310.

As discussed in the First Example section, the operating time before the second (M2) warning is displayed can be reduced by an appropriate amount when high-energy consumption function are executed by the battery-powered computer 100. Some battery-powered computers 100 use nickel cadmium (NiCad) batteries for wireless communications. The NiCad batteries can be recharged by the primary energy source. This charging of the NiCad batteries is another high-energy consumption function that causes the required operating time before the M2 warning to be reduced.

Advantages of the Invention

A battery-powered computer 100, representing an embodiment of the invention, can be cost effective and advantageous for at least the following reasons. Battery-powered computers 100 according to the invention reserve a residual energy to provide a period of time in which the user can perform critical memory saving functions using the primary energy source before the primary energy source discharges to the cutoff voltage. By implementing a lockout in hardware, various embodiments of the invention ensure that these functions will be available even in the event of software errors. Preventing loss of key data can save users of the battery-powered computer 100 time in circumstances where the data can be found elsewhere or redone. Otherwise the data loss prevention ensures that irreplaceable data is retained in the battery-powered computer 100.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein. For example, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended sub-claims.

What is claimed is:

1. A battery-powered computer comprising:
   a primary energy source including at least one battery, the battery having an energy capacity;
   a processor configured to:
      calculate a measure of time after a signal is received by the processor; and
      provide a warning message based on the measure of time, the warning message indicates that the energy capacity has discharged to a low level.

2. The battery-powered computer of claim 1, including hardware resources coupled with the processor to respond to the operating voltage being approximately equal to a hardware lockout voltage by preventing the activation of power and applications in the battery-powered computer; and
   wherein:
      the primary energy source has a cutoff voltage below which no functioning of the battery-powered computer can be executed using the primary energy source; and
      upon discharging to the hardware lockout voltage, the primary energy source retains a residual energy above the cutoff voltage, the residual energy being sufficient for the battery-powered computer to perform at least one function before the primary energy source discharges to the cutoff voltage.

3. The battery-powered computer of claim 2, wherein the primary energy source includes at least one rechargeable battery.

4. The battery-powered computer of claim 3, wherein:
   the at least one function is performed within a first duration before the primary energy source discharges to the cutoff voltage; and
   the first duration includes a duration for replacing the at least one replaceable battery.

5. The battery-powered computer of claim 2, wherein the at least one function includes at least one of:
   retaining data stored in a memory disposed in the battery-powered computer; and
   synchronizing data stored in the memory with data stored in an external data source.

6. The battery-powered computer of claim 1, including at least one timer, each timer being adapted to measure time after a first action, and each timer being coupled with the warning calculation circuit to provide an indication of a corresponding measure of time after the first action.

7. The battery-powered computer of claim 6, wherein:
   the at least one timer is disposed in the warning calculation circuit; and
   the measure of time includes at least one of:
      elapsed time after the first action; and
      operation time of the battery-powered computer after the first action.

8. The battery-powered computer of claim 6, including processing resources adapted to accelerate the operation time during operation of high-energy consumption functions in the battery-powered computer.

9. The battery-powered computer of claim 1, further comprising:
   a memory coupled with the processor, the memory including a residual energy management module adapted to store at least one action voltage level and the measure of time;
   an analog to digital converter connected to the primary energy source and the processor, the analog to digital converter being adapted to provide a digital signal corresponding to the operating voltage to the memory; and
   wherein the residual energy management module is adapted to respond to at least one of the operating voltage discharging to approximately a first action voltage level, or to the time being approximately equal to the measure of time by causing a corresponding action.

10. The battery-powered computer of claim 9, including an interrupt controller is coupled with the analog to digital converter in order to respond to the operating voltage being approximately equal to a software lockout voltage by preventing the activation of power and applications in the battery-powered computer.

11. The battery-powered computer of claim 1, wherein the signal corresponds to a first warning message based on the operating voltage discharging to approximately a first warning message voltage.

12. The battery-powered computer of claim 1, including a warning calculation means having one of:
   a circuit disposed in the processor, and
   a set of instructions disposed in the memory.

13. A battery-powered computer comprising:
   a primary energy source including at least one battery, the battery having:
      an operating voltage; and
      a cutoff voltage below which no functioning of the battery-powered computer can be executed using the primary energy source;
   a processor; and
   hardware resources coupled with the processor to respond to the operating voltage being approximately equal to a hardware lockout voltage by preventing the activation of power and applications in the battery-powered computer,
   wherein upon discharging to the hardware lockout voltage, the primary energy source retains a residual energy above the cutoff voltage, the residual energy being sufficient for the battery-powered computer to perform at least one function before the primary energy source discharges to the cutoff voltage, and
   wherein the first function is performed within a first duration before the primary energy source discharges to the cutoff voltage, the first duration corresponding to a duration between charging opportunities for the battery-powered computer.

14. The battery-powered computer of claim 13, wherein:
   the primary energy source includes at least one replaceable battery;
   the at least one function is performed within a first duration before the primary energy source discharges to the cutoff voltage; and
   the first duration is sufficient for replacing the at least one replaceable battery.

15. The battery-powered computer of claim 13, wherein the hardware resources include a voltage comparator coupled with the primary energy source to compare the operating voltage with the hardware lockout voltage.

16. The battery-powered computer of claim 13, wherein the battery has an energy capacity, and the battery-powered computer includes a memory coupled with the processor to:
   calculate a measure of time after a signal is received by the processor; and
   provide a warning message based on the measure of time, the warning message indicates that the energy capacity has discharged to a low level.

17. The battery-powered computer of claim 16, wherein the signal corresponds to a first warning message based on the operating voltage discharging to approximately a first warning message voltage.

18. A method implemented for operating a battery-powered computer, the method comprising:
   receiving a signal at a first time;
   starting at least one timer at approximately the first time;
   tracking at least a first measure of time from the first time; and
   responsive to the first measure of time being detected as being equal to a second time, providing a warning that a primary energy source of the battery-powered computer has discharged to a low energy capacity.

19. The method of claim 18, wherein receiving a signal includes discharging the primary energy source to a first warning voltage.

20. The method of claim 19 wherein:
   tracking at least a first measure of time from the first time includes tracking elapsed time from the first time; and
   the method further includes tracking a second measure of time based on an operating time of the battery-powered computer from the first time; and
   wherein after the first time, but before the elapsed time being equal to a second time, and before the operating time is equal to a third time, the method further includes:
      recharging the rechargeable battery to a voltage greater than the first warning voltage;
      determining that the rechargeable battery voltage is greater than the first warning voltage; and
      responsive to determining that the rechargeable battery voltage is greater than the second voltage:
         stopping the at least one timer;
         stopping tracking the first measure of time and the second measure of time; and
         resetting the at least one timer to zero.

21. The method of claim 19, wherein:
   tracking at least a first measure of time includes tracking an operating time of the battery-powered computer from the first time; and
   of the battery powered computer in response to the operating time being equal to a third time.

22. The method of claim 21, including reducing the operating time during operations of high-energy consumption processes in the battery-powered computer, the high-energy consumption processes include at least one of: providing back-lighting of a display powered by the primary energy source, performing a data synchronization, and performing a wireless communication.

23. The method of claim 19, wherein:
   tracking at least a fist measure of time includes tracking elapsed time from the first time; and
   responsive to the elapsed time being equal to a second time, providing the warning to the user.

24. The method of claim 19, including:
   discharging the primary energy source to a software lockout voltage that is greater than the hardware lockout voltage level; and
   responsive to discharging the primary energy source to the software lockout voltage, preventing activation of power and applications in the battery-powered computer.

25. The method of claim 24, wherein responsive to the primary energy source discharging to the software lockout voltage, the method includes placing the battery-powered computer into a low-energy consumption state.

26. The method of claim 24, wherein the method includes coupling an analog to digital converter to the primary energy source and operating a program in cooperation with the analog to digital converter in order to determine when the primary energy source discharges to the software lockout voltage.

27. The method of claim 24, wherein preventing activation of power and applications includes coupling an analog to digital converter to an interrupt controller to respond to the rechargeable battery voltage being detected as being equal to the software lockout voltage by masking processor interrupt signals.

28. The method of claim 18, including:
   the primary energy source discharging to a hardware lockout voltage level;
   responsive to the primary energy source discharging to approximately the hardware lockout voltage, preventing activation of power and applications in the battery-powered computer; and
   wherein upon discharging to the hardware lockout voltage level, the method includes retaining a residual energy sufficient to perform at least one function within a first duration before the primary energy source discharges to a cutoff voltage.

29. A method of using residual energy of a primary energy source disposed in a battery-powered computer, the method comprising:
   discharging the primary energy source to a hardware lockout voltage level;
   responsive to discharging the primary energy source to the hardware lockout voltage, preventing activation of power and applications in the battery-powered computer;
   upon discharging to the hardware lockout voltage level, retaining in the primary energy source a residual energy sufficient to perform at least one function within a first duration before the primary energy source discharges to a cutoff voltage;
   starting at least one timer at approximately the first time;
   tracking at least a first measure of time from approximately the first time; and
   responsive to the first measure of time being equal to a second time, providing a warning that the primary energy source has discharged to a low energy capacity level.

30. The method of using residual energy of claim 29, further comprising:
   coupling a voltage comparator to the primary energy source and the processor; and
   setting the voltage comparator to the hardware lockout voltage, and
   coupling the voltage comparator with hardware resources to mask processor interrupt signals corresponding to activation of power and applications.

31. The method of using residual energy of claim 29, wherein:
   tracking at least a first measure of time includes tracking at least one of:
      operation time of the battery-powered computer and elapsed time; and
      providing a warning that the primary energy source has discharged includes:
         detecting the operation time as being equal to a third time; and detecting the elapsed time as being equal to a fourth time.

32. The method of using residual energy of claim 29, including:

prior to discharging to discharging the primary energy source to the hardware lockout voltage level, discharging the primary energy source to a first warning voltage that is greater than the hardware lockout voltage; and responsive to discharging the primary energy source to the first warning voltage, providing a first warning.

33. The method of using residual energy of claim 29, wherein the method includes detecting the primary energy source as having a voltage that is equal to the hardware lockout voltage, and placing the battery-powered computer into a low-energy consumption state in response to detecting the primary energy source as having the voltage.

34. The method of using residual energy of claim 29, wherein:

retaining in the primary energy source a residual energy sufficient to perform at least one function includes retaining in the primary energy source the residual energy that is sufficient to retain data stored in the battery-powered computer for a first duration, wherein the primary energy source includes a rechargeable battery, and the first duration corresponds to a duration between charging opportunities for the battery-powered computer.

35. The method of using residual energy of claim 29, wherein retaining in the primary energy source a residual energy sufficient to perform at least one function includes retaining in the primary energy source the residual energy that is sufficient to perform the at least one function that includes at least one of:

exchanging data using a wireless transmission;

exchanging data with an external data source to synchronize files;

switching to another energy source; and performing memory integrity testing.

36. A battery-powered computer comprising:

primary means for providing energy to operate the battery-powered computer, including at least one battery, the battery having an energy capacity;

processing means including warning calculation means; and data storage means coupled with the processing means to provide a time-based warning message based on a measure of time after a signal is received by the processing means, the warning message indicates that the energy capacity has discharged to a low level.

37. A battery-powered computer comprising:

primary means for providing energy to operate the battery-powered computer, including at least one battery, the battery having:

an operating voltage; and a cutoff voltage below which no functioning of the battery-powered computer can be executed using the primary energy source;

processing means;

hardware means for preventing the activation of power and applications in the battery-powered computer, the hardware means coupled with the processing means to respond to the operating voltage being detected as being equal to a hardware lockout voltage by preventing the activation of power and applications, when the primary means for providing energy discharges to the hardware lockout voltage the primary means for providing energy retains a residual energy above the cutoff voltage sufficient for the battery-powered computer to perform at least one function before the primary means for providing energy discharges to the cutoff voltage.

* * * * *